United States Patent [19]

Vierstraete

[11] 3,851,557

[45] Dec. 3, 1974

[54] CUTTING APPARATUS WITH WORK CLAMP

[76] Inventor: Jean Vierstraete, 83, rue Victor Hugo, 62 Oignies, France

[22] Filed: Nov. 1, 1973

[21] Appl. No.: 412,045

[52] U.S. Cl. .............. 83/453, 83/461, 83/465, 83/466, 83/486, 83/581
[51] Int. Cl. ............................................ B23d 47/04
[58] Field of Search ......... 83/581, 471.1, 473, 486, 83/487, 477.1, 46.5, 461, 466, 453

[56] References Cited
UNITED STATES PATENTS
| | | | |
|---|---|---|---|
| 528,738 | 11/1894 | Pfouts | 83/461 |
| 1,319,272 | 10/1919 | De Mars | 83/473 |
| 2,769,224 | 11/1956 | Hake | 83/461 X |

FOREIGN PATENTS OR APPLICATIONS
| | | | |
|---|---|---|---|
| 386,208 | 2/1961 | Switzerland | 83/581 |
| 494,162 | 3/1930 | Germany | 83/473 |

Primary Examiner—Frank T. Yost
Attorney, Agent, or Firm—Paul & Paul

[57] ABSTRACT

Cutting apparatus for obliquely cutting elongate workpieces of substantial dimensions such as girders comprises a frame which supports a circular saw for rotation about a horizontal axis. Opposed to the saw is a workpiece locating and clamping device having two sets of clamping jaws which are spaced apart by a distance just sufficient to enable the saw to pass therebetween. The clamping device and the saw are pivotal about vertical axes and means are provided for coordinating this pivotal movement so that the inclination of the saw required for producing a particular angle of cut coincides with the inclination of the gap between the two sets of jaws.

7 Claims, 9 Drawing Figures

CUTTING APPARATUS WITH WORK CLAMP

The present invention relates to cutting apparatus capable of producing an oblique cut, in particular for sections of large dimensions, constituted by a frame supporting a circular saw having a horizontal axis of rotation and by a device for locating and clamping the section in a horizontal disposition, the saw being able to move about a diametral vertical axis thereof, said axis being perpendicular to and intersecting the axis of the section to be cut.

The cutting of sections with a straight transverse cut is widely known and is readily achieved by locating and clamping the section in horizontal and vertical clamping jaws and by moving the circular saw blade forwards as close as possible to the jaws of the vices. It would be convenient to adapt cutting apparatus for producing a straight cut to provide the facility for producing an oblique cut. This causes a problem in that the clamping device hinders the movement of the saw. In fact, when the cutting angle of the section departs only slightly from the straight cut, the saw may be moved longitudinally and operated such that it does not abut against the clamping device. In this case, it is necessary to move the clamping device or devices apart sufficiently with consequent poor retention of the section, in the same way as when one is obliged to cut it with a certain overhang. This results in vibrations of the section and poor operation of the cutting tools. When it is desired to retain the section by two clamping devices, one is thus forced to provide a considerable drop of the section, which increases the cost price. It will be understood that the inclination of the saw alone, without pivoting the clamping device parallel to the saw, is only acceptable for slight cutting angles.

Larger machines were thus devised for producing oblique cuts of pronounced angles for large sections. These are swan-neck machines which are modifications of straight cut machines and have a frame in the form of a swan's neck for supporting, at the upper part, the saw and, at the lower part, the clamping device. In such machines, difficulties occur as regards the clamping device which clamps the section obliquely and produces torque on the latter. For considerable cutting angles, this type of machines requires a swan-neck of large dimensions swivelling on an underlying turret with the result that the machine is heavy, large and, despite everthing, the cutting angle is still limited by the back of the swan's-neck which strikes against the section.

It is an object of the invention to obviate or mitigate these disadvantages.

According to the present invention, there is provided cutting apparatus capable of producing an oblique transverse cut in an elongate workpiece, comprising a frame supporting a circular saw rotatable about a horizontal axis, and an angularly movable device for locating and clamping the workpiece in horizontal and vertical directions, the saw being movable about its diametral vertical axis which is perpendicular to and intersects with the longitudinal axis of the workpiece in the cutting position, the clamping device comprising at least one set of jaws with fixed clamping surfaces, means being provided for coordinating angular movement of the clamping device and the saw so that, even with large cutting angles, the saw is always located as near as possible to the set of jaws, said jaws being movable independently to clamp the workpiece, after the saw and jaws have been adjusted into the required attitude for a desired angle of cut, without causing any rotation or deformation of the workpiece.

Preferably, the cutting apparatus has two sets of jaws spaced apart just sufficiently to allow the passage of the saw therebetween.

Advantageously, the clamping device and the saw are mounted on respective turrets, each set of jaws comprising six independent jaws some of which effect vertical clamping and have plane gripping surfaces and others of which effect horizontal clamping and have cylindrical gripping surfaces with a vertical axis, said jaws serving to locate the workpiece initially vertically and then horizontally, clamping occurring only after the workpiece is located by all the jaws, locking of the horizontally clamping jaws possibly occurring after locking of the vertically clamping jaws.

Preferably, the means for coordinating the angular movements of the clamping device and the saw comprises a mechanical coupling consisting of a vertical shaft at each of whose ends is a pinion meshing with a ring of teeth on the respective turret, the two rings of teeth, on the one hand, and the two pinions on the other hand, having the same diameters.

In a preferred embodiment, each set of six jaws comprises upper and lower pairs of jaws for vertical clamping of the edges of the workpiece and one pair of jaws for horizontal clamping of the edges of the workpiece.

The invention will now be further described by way of example only, with reference to the accompanying drawings, in which.

Figure 8:
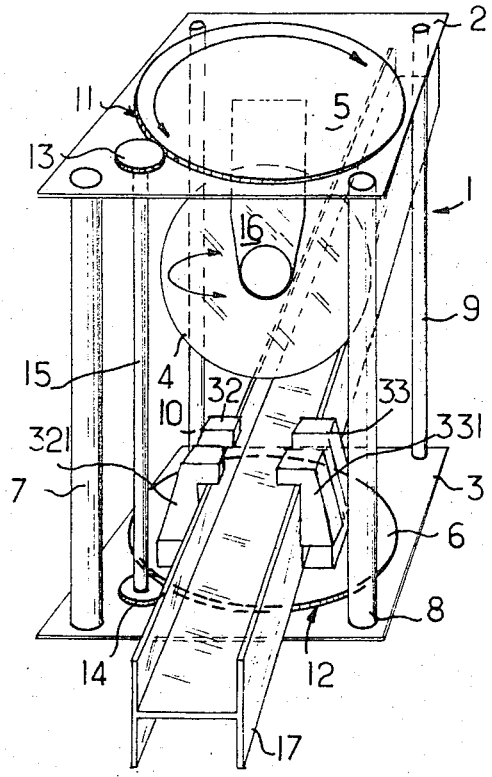
FIG. 8 is a diagrammatic perspective view of two turrets, one supporting the saw and the other the clamping device, the latter not being shown for the sake of clarity of the drawing.

In a simplified form, the cutting apparatus (FIG. 8) comprises a frame 1 constituted by two horizontal plates 2 and 3 respectively provided for a circular saw 4 supported by a turret 5 slidable on the plate 2 and for a clamping device (not shown) supported by the turret 6 slidable on the plate 3. The two plates 2 and 3 are interconnected by vertical pillars 7, 8, 9, 10. The two turrets 5 and 6 are coaxial and parallel to each other. On their periphery, are rings of teeth 11 and 12 respectively, which mesh with respective pinions 13 and 14 interconnected by a vertical shaft 15. The pinions 13 and 14 on the one hand and the rings of teeth 11, 12 on the other hand, have the same diameters such that the movements of the turrets 5 and 6 are perfectly synchronized and identical. The saw 4 is connected to the turret 5 by a support 16 and is driven by a conventional reduction motor (not shown).

A girder 17 to be cut into sections is introduced between the pillars 7, 8, 9, 10 and is locked in a desired position by the clamping device provided on the turret 6 and described below. The girder 17 to be cut into sections is supported by means other than the device as shown so that the device may be oriented relative to the work prior to actuation of the clamps and the saw. The shaft 15 is rotated through the angle required to bring the saw 4 into the desired cutting attitude. The clamping device is then locked and the saw 4 is lowered into the cutting position and caused to advance by means of a feed device which is part of the support 16 and which is not shown. This feed device is standard in known cutting machines, whether they are intended for a straight or oblique cut.

Figure 9:
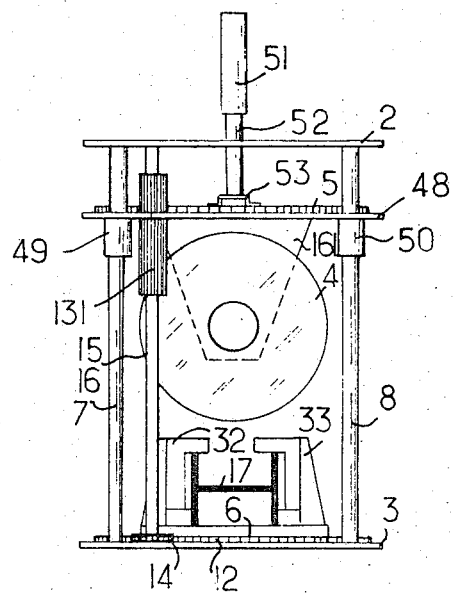
FIG. 9 is an elevation of a second embodiment of the cutting apparatus which differs from the first embodiment as regards the feed device for the saw.

In the second embodiment shown in FIG. 9, a plate 48 is disposed parallel to the plates 2 and 3 and is slidable on the pillars 7, 8, 9, 10 which it engages with slides 49, 50. The turret 5 is located on the plate 48 which is moved and not on the plate 2. The plate 48 is moved by a feed device 51 which, in the example shown, is a hydraulic jack coaxial with the turrets 5 and 6. The rod 52 of the jack 51 is connected to the turret 5 by a pivot 53. The turret 5 still has its ring of teeth 11 which, in this case, meshes with an elongated pinion 131 whose length corresponds to the stroke of the plate 48 on the pillars 7, 8, 9, 10. The saw 4 is suspended from the turret 5 by a support 161 which is stationary.

In this manner, the angular position of the turret 5 is still synchronized with the turret 6 by the kinematic chain constituted by the ring of teeth 12, the pinion 14, the shaft 15, the elongated pinion 131 and the ring of teeth 11. The feed and return movements of the saw 4 are effected by the jack 51.

The clamping device which is fixed to the turret 6 will now be described.

Figure 4:
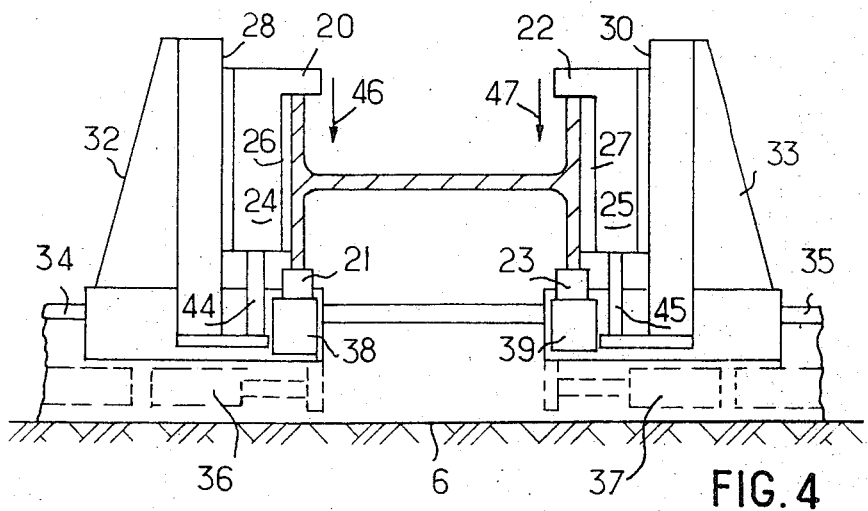
Figure 5:
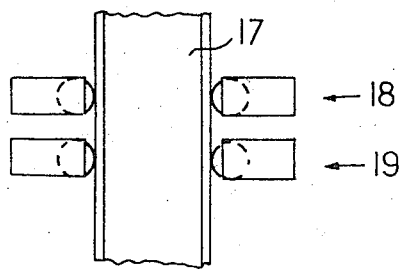
FIGS. 5 and 6 are diagrammatic plan views showing the operation of the jaws of the clamping device when clamping horizontally.
Figure 6:
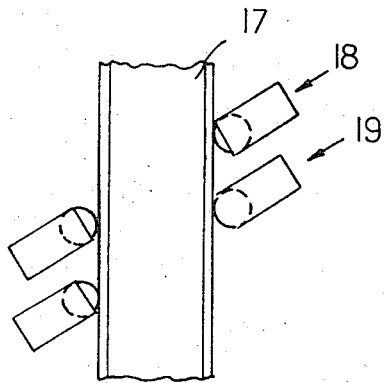
Figure 7:
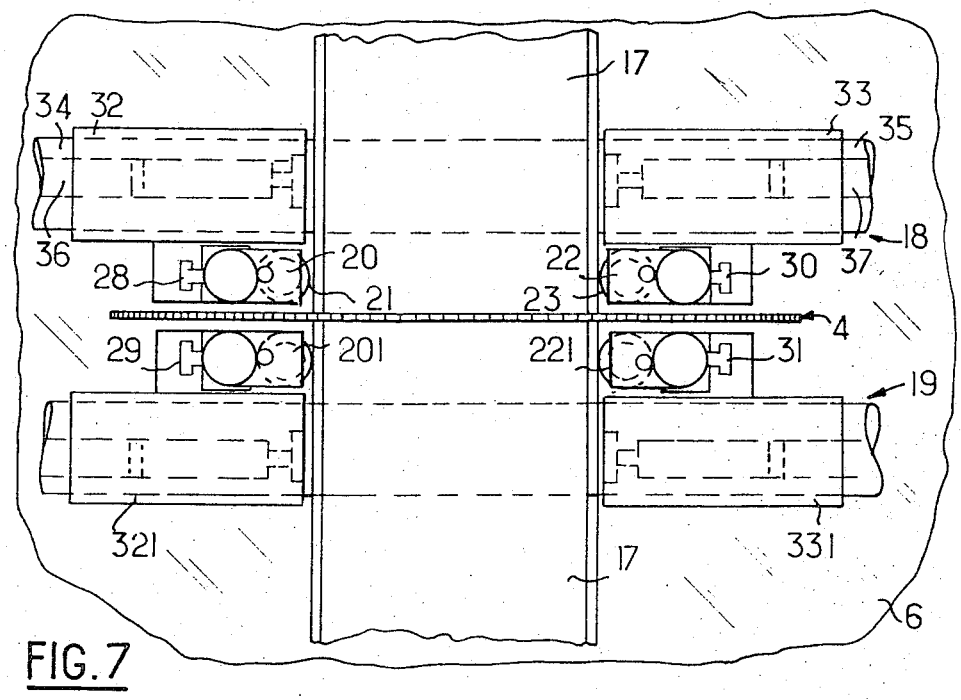
FIG. 7 is a more detailed diagrammatic plan view of the saw and of the clamping device in the position for a straight cut.

Referring to FIGS. 5, 6 and 7, it will be seen that the clamping device comprises two sets 18 and 19 of clamping jaws or cheeks, the set of jaws 18 being very close to the set of jaws 19 so that the saw 4 can just pass between them. The set of jaws 18 and 19 are designed to prevent rotation of the girder 17 about an axis parallel to the axis of rotation of the turrets 5 and 6. For this purpose, six cheeks are provided in each set of jaws 18 and 19, e.g., for the set 18, four vertical clamping jaws 20, 21, 22, 23, having planar clamping surfaces, and two horizontal clamping jaws 24, 25 having cylindrical clamping surfaces 26, 27 with a vertical axis (FIGS. 1, 2, 3 and 4). The set of jaws 19 is identical but only two of the vertical jaws 201, 221 are referenced in FIG. 7.

The vertical clamping jaws 20, 22, 201, 221 are slidable vertically in respective slides 28, 30, 29, 31 which are provided in respective supports 32, 33, 321, 331, which may in turn slide horizontally on respective slides (34, 35 for supports 32, 33) which are fixed to the turret 6. The supports 32, 33 are movable (see FIGS. 1, 2, 3, 4) by hydraulic jacks 36, 37 respectively, whereas the jaws 20 and 22 are movable by hydraulic jacks which are located in the cheeks 24, 25, behind the clamping surfaces 26, 27. Hydraulic jacks 38 and 39 serve for actuating the vertical clamping jaws 21 and 23 and are fixed to a part of the supports 32, 33. In the second set of jaws 19, there are identical parts, namely supports 321 and 331 as well as all the corresponding jaws and actuating jacks.

The operating sequences and the sequences of forwards movement and clamping of the various hydraulic jacks are determined by a control device of known type which is diagrammatically shown in the drawings. This device must firstly produce a feed movement without clamping of the various jaws, then a clamping action of said jaws without appreciable movement, all the operations occurring in precise order as described hereafter with reference to FIGS. 1 to 4.

Figure 1:
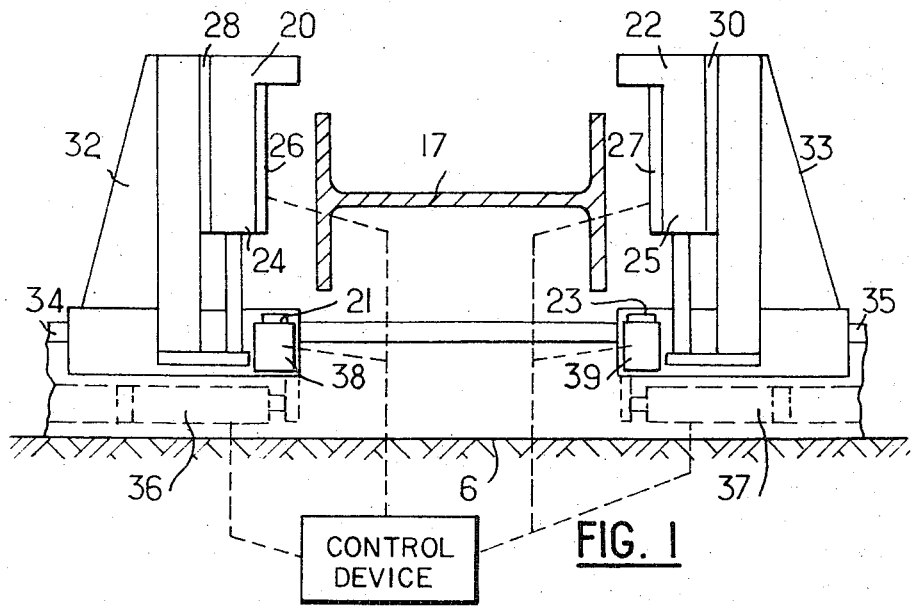
FIGS. 1 to 4 are diagrammatic vertical sections at right-angles to the long axis of an H-section and show successive stages in the operation of one embodiment of clamping device according to the invention.

In the position shown in FIG. 1, the girder 17 has been introduced between the pillars 7, 8, 9, 10 and between the jaws of both sets of jaws 18 and 19 of the clamping device (only the jaws 20 to 25 of the first set 19 being visible) after the latter has been placed in the appropriate angular position which may be that of FIG. 5 or that of FIG. 6. In this position, the various jaws are spaced from the girder 17.

Figure 2:
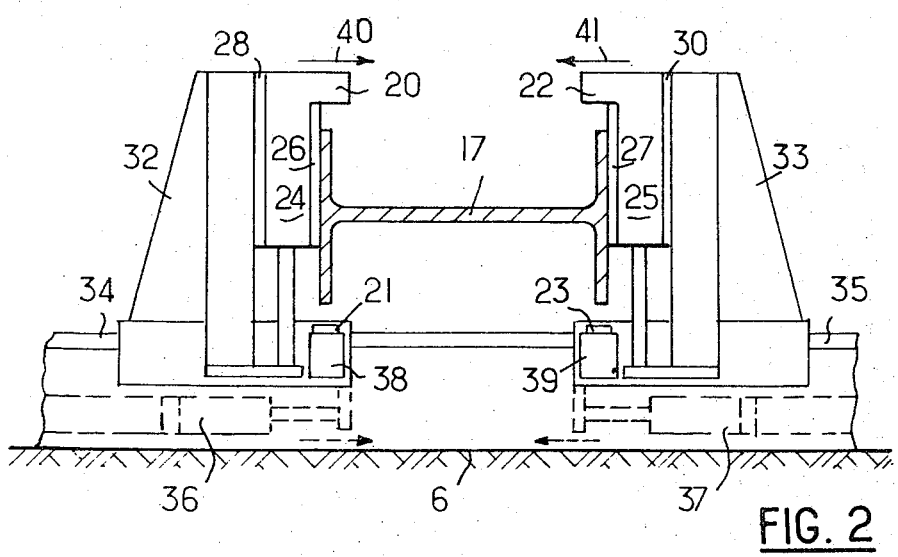
Figure 3:
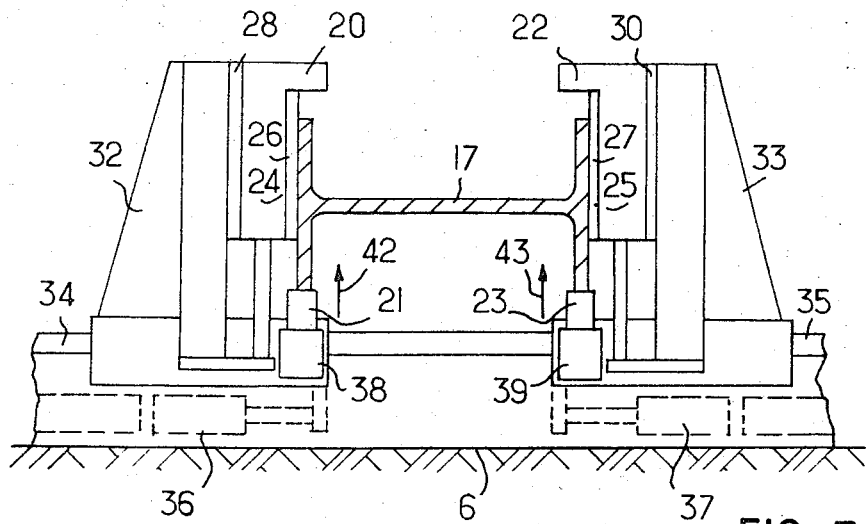

The various jaws are then moved towards the girder 17 until they come into contact therewith without exerting any appreciable force thereon. As is shown in FIG. 2, the jacks 36 and 37 are actuated in order to move the supports 32 and 33 towards each other on the slides 34 and 35 whereby the clamping surfaces 26 and 27 come into contact with the sides of the girder 17. As soon as this contact has been established, the jacks 38 and 39 are actuated to raise the jaws 21 and 23 (arrows 42, 43 in FIG. 3) into contact with the bottom of the girder 17 without exerting any force. The jacks located in the jaws 24 and 25 are then actuated and bear on the rods 44 and 45 which are fixed to the support 32, 33 so as to move the arrangement of the jaws 24 and 20 and the clamping surface 26, and the jaws 25 and 22 and the clamping surface 27, respectively, in the direction of arrows 46 and 47 (FIG. 4) in order to bring the cheeks 20 and 22 into contact with the top of the section. All these feed movements of the jaws 20, 21, 22, 23, 24, 25, are reproduced in the second set of jaws 19 and take place in one direction, i.e., non-return valves in the hydraulic devices prevent any return movement of the jaws under a force acting in a direction opposite to that of the feed movement.

Consequently, in the position of FIG. 4, the girder 17 is located by the clamping device and it remains for the clamping proper to be carried out.

The clamping is achieved by acting on the vertical clamping cheeks 20, 22 so as to positively lock the girder. After this first clamping operation, it is possible to carry out a second clamping operation, by acting on the jacks 36 and 37 such that the cylindrical clamping surfaces 26, 27 of the jaws 24, 25 are urged against the sides of the girder 17, the risk of pivotal movement of the girder 17 being avoided, since the latter is already retained in the vertical clamping jaws.

Naturally, the same clamping operations are carried out by the set of jaws 19.

After clamping, the girder 17 is cut with the saw 4.

When the cutting operation is completed, the jaws may be unlocked, the girder advanced and the above sequence of operations repeated.

It will be apparent from the above that during the cutting operation, the girder is rigidly held at both sides of the cut and there is no risk of vibration during the action of the saw 4. Since the two sets of jaws 18 and 19 are close to each other, the drop of the section is very slight. Moreover, since it is possible for the turrets 5 and 6 not to be limited in their rotation, the oblique cutting angles may be very considerable. Finally, the frame 1 having two plates 2, 3 and having four pillars 7, 8, 9, 10 is much smaller than a swan-neck frame.

A further advantage is that the clamping is carried out without any deformation of the section, which is extremely important since it eliminates any vibration factor and mechanical stress on the saw during the cutting operation and above all during the final stage of cutting.

I claim:

1. Cutting apparatus capable of producing an oblique transverse cut in an elongate workpiece, comprising a frame supporting a circular saw rotatable about a horizontal axis, and an angularly movable device for locating and clamping the workpiece in horizontal and vertical directions, the saw being movable about its diametral vertical axis which is perpendicular to and intersects with the longitudinal axis of the workpiece in the cutting position, the clamping device comprising at least one set of jaws with fixed clamping surfaces, means being provided for coordinating angular movement of the clamping device and the saw so that, even with large cutting angles, the saw is always located as near as possible to the set of jaws, said jaws being movable independently to clamp the workpiece, after the saw and jaws have been adjusted into the required attitude for a desired angle of cut, without causing any rotation or deformation of the workpiece.

2. Cutting apparatus as claimed in claim 1, having two sets of jaws spaced apart just sufficiently to allow the passage of the saw therebetween.

3. Cutting apparatus as claimed in claim 2, wherein the clamping device and the saw are mounted on respective turrets, each set of jaws comprising six independent jaws some of which effect vertical clamping and have plane gripping surfaces and other of which effect horizontal clamping and have cylindrical gripping surfaces with a vertical axis, said jaws serving to locate the workpiece initially vertically and then horizontally, clamping occurring only after the workpiece is located by all the jaws, locking of the horizontal clamping jaws occurring after locking of the vertically clamping jaws.

4. Cutting apparatus as claimed in claim 3, wherein the means for coordinating the angular movements of the clamping device and the saw comprises a mechanical coupling consisting of a vertical shaft at each of whose ends is a pinion meshing with a ring of teeth on the respective turret, the two rings of teeth, on the one hand, and the two pinions on the other hand, having the same diameters.

5. Cutting apparatus as claimed in claim 3, wherein each set of six jaws comprises upper and lower pairs of jaws for vertical clamping of the edges of the workpiece and one pair of jaws for horizontal clamping of the edges of the workpiece.

6. Cutting apparatus as claimed in claim 5, wherein each upper vertical clamping jaw is integral with a respective one of the horizontal clamping jaw and may slide vertically on the latter in appropriate slides each upper vertical jaw and the clamping surface of the associated horizontal clamping jaw forming a single right-angled member which can move horizontally.

7. Cutting apparatus as claimed in claim 6, wherein the jaws are moved by hydraulic jacks in dependence upon a control device.

* * * * *